(12) United States Patent
Alkemper et al.

(10) Patent No.: US 8,025,818 B2
(45) Date of Patent: Sep. 27, 2011

(54) PROCESS FOR THE PRODUCTION OF AN OPTICAL LENS

(75) Inventors: Jochen Alkemper, Klein-Winternheim (DE); Joe Hayden, Clarks Summit, PA (US); José Zimmer, Ingelheim (DE); Frank-Thomas Lentes, Bingen (DE); Steffen Reichel, Mehlingen (DE); Ulrich Peuchert, Bodenheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 12/700,022

(22) Filed: Feb. 4, 2010

(65) Prior Publication Data
US 2010/0155973 A1 Jun. 24, 2010

Related U.S. Application Data

(62) Division of application No. 11/523,738, filed on Sep. 20, 2006, now abandoned.

(30) Foreign Application Priority Data

Sep. 21, 2005 (DE) .................. 10 2005 045 197

(51) Int. Cl.
*B29D 11/00* (2006.01)
(52) U.S. Cl. ................... 264/1.21; 65/37; 65/44; 65/45; 264/1.7
(58) Field of Classification Search .......... 264/1.7, 264/1.32, 1.1, 2.5, 1.21; 425/808; 65/36, 65/37, 44, 45, 47, 48
See application file for complete search history.

(56) References Cited

U.S. PATENT DOCUMENTS

| | | |
|---|---|---|
| 4,927,480 A | 5/1990 | Vaughan |
| 5,846,638 A | 12/1998 | Meissner |
| 6,424,460 B1 * | 7/2002 | Kirkham ............... 359/353 |
| 6,689,704 B2 | 2/2004 | Ota et al. |
| 2004/0105155 A1 | 6/2004 | Hori et al. |

(Continued)

FOREIGN PATENT DOCUMENTS

DE 103 19 706 11/2004

(Continued)

OTHER PUBLICATIONS

Office Action for Co-Pending Application No. 2006 255005 dated Sep. 28, 2010.

(Continued)

*Primary Examiner* — Mathieu D. Vargot
(74) *Attorney, Agent, or Firm* — Millen, White, Zelano, Branigan, P.C.

(57) ABSTRACT

The invention relates to an optical hybrid lens. According to the invention, the lens consists of a substrate (1) that consists of a ceramic having a predetermined shape and at least another material (2), which covers a surface of the substrate (1) at least in certain sections in order to form a lens surface. Use of an optical ceramic as a material enables an additional degree of freedom for adjusting the imaging properties of the hybrid lens. The optical ceramic may have a high refractive index and a low dispersion. The other material can be a material that can be deformed or recast at temperatures that are low in comparison to those of the optical ceramic. In particular the other material can be a low-TG glass or a polymer. The other material is directly applied onto the substrate without a further surface finishing being necessarily required.

Other aspects of the invention relate to an optical lens group, an optical image acquisition device, and a process for manufacturing a hybrid lens.

11 Claims, 5 Drawing Sheets

U.S. PATENT DOCUMENTS

| | | |
|---|---|---|
| 2005/0162744 A1 | 7/2005 | Tenmyo |
| 2005/0185300 A1 | 8/2005 | Kittelmann et al. |
| 2006/0238880 A1 | 10/2006 | Takahashi |
| 2007/0171538 A1 | 7/2007 | Kintaka et al. |
| 2008/0248267 A1 | 10/2008 | Taylor |

FOREIGN PATENT DOCUMENTS

| | | |
|---|---|---|
| JP | 361203401 | 9/1986 |
| JP | 03 25401 | 2/1991 |
| JP | 2003 128465 | 5/2003 |
| JP | 2004 62061 | 2/2004 |
| JP | 2004 75517 | 3/2004 |
| JP | 2005 189858 | 7/2005 |
| JP | 2005 209549 | 8/2005 |
| WO | WO 2005/036235 | 4/2005 |

OTHER PUBLICATIONS

English Translation of Office Action for Co-Pending Application No. 2006 255005 dated Sep. 28, 2010.

Full English Translation of JP-03 25401 dated Feb. 4, 1991.

Murata Mfg Co Ltd., "Translucent ceramic, optical component and optical device using the same," Patent Abstracts of Japan, Publication Date: Mar. 11, 2004; English Abstract of JP-2004 075517.

Konoshima Chemical Co Ltd., "Sintered translucent scandium oxide and process for making the same," Patent Abstracts of Japan, Publication Date: May 8, 2003; English Abstract of JP-2003 128465.

\* cited by examiner

PROCESS FOR THE PRODUCTION OF AN OPTICAL LENS

This application is a divisional of U.S. patent application Ser. No. 11/523,738, filed on Sep. 20, 2006, now abandoned.

This application claims the priority of the German Patent Application 10 2005 045 1973 "Optical Lens or Lens Group, Process for the Production Thereof as Well as Optical Image Acquisition Device," filed on Sep. 21, 2005, whose content is expressly included herewith by way of reference.

FIELD OF THE INVENTION

This invention relates in general to the field of optical lenses and relates in particular to hybrid lenses that consist of at least two different materials.

BACKGROUND OF THE INVENTION

Hybrid lenses, which consist of different materials, are known in the form of glass polymer hybrids from the prior art. The latter consist of a glass, generally in spherical shape, which is surrounded by a polymer, generally with an aspherical outside shape. The hybrid lenses thus consist of at least two different materials with different refractive indices and different dispersion. By using at least one other material, the imaging properties of the hybrid lens, in particular refractive power, chromatic aberration and other imaging defects, can be suitably adjusted.

Usually glass/polymer hybrid lenses are used, for example, for use in optical pick-up systems. The refractive index of glasses or polymers is relatively low, however, or the dispersion is usually relatively high. In addition, disadvantages of the plasticity of glasses are compensated for by the combination with the plastic polymer that can easily be deformed.

While precision lenses made of glass must be ground at great expense and finished, production processes, such as, for example, injection molding or pressing, with which lens elements can be produced in a simple way and without expensive surface finishing, are increasingly demanded for reasons of cost. Lenses or lens systems that are produced in such a way increasingly find use now in consumer electronic devices, for example as single lenses or lenses of hand-held cameras or digital cameras. With the material combinations that are currently available, optical imaging defects can often be compensated for only inadequately, however, since the refractive index of glasses is comparatively low or the dispersion is too high. This limits the achievable optical qualities with respect to resolution, monochromatic defects (for example spherical aberration) and chromatic defects, and with respect to other optical properties.

U.S. Pat. No. 5,846,638 A discloses the manufacturing of hybrid optical elements using a particular bonding process, which requires an optical contact between the surfaces to be connected, which can be achieved only by an extremely fine polishing or lapping of the surfaces. This connecting technique is possible only for the connecting of flat surfaces by bonding. A curved surface of a lens in terms of this application cannot be connected to another material in the meaning of this application.

DE 103 19 706 A1 discloses the formation of small glass elements by quick immersion of a glass melt in a cooling liquid.

US 2004/0105155 A1 discloses a lens array that consists of several individual lenses, but no optical hybrid lens in the meaning of this application. For the production, first a liquid to be hardened is put into a form, and then a substrate is applied. Finally, a lens array is produced. The sequence of steps can also be varied. For this purpose, the use of a glass ceramic is disclosed, but not an optical ceramic in terms of this application.

US 2005/0185300 A1 discloses an optical element having a stepped lens such as a Fresnel lens and a light-diffusing element, which is arranged only in a central region of the element. This enables to suppress the light source or luminous body image. It is also possible to reduce faults of illuminating beam paths given a suitable choice of the diffusing structure and the geometric dimensioning thereof. The stepped lens and/or the diffusing screen can be made of glass or glass ceramic, which is not an optical ceramic in the meaning of this application.

SUMMARY OF THE INVENTION

The object of this invention is thus to provide an optical hybrid lens and a process for the production thereof, with which simple and economical production processes can be carried out and nevertheless a high resolution or imaging quality can be achieved. According to another aspect of this invention, in particular an optical hybrid lens and a process for the production thereof is to be provided, with which processing techniques that are suitable for mass production can be carried out, in particular for the production of precision optical systems for consumer electronics devices. According to another aspect of this invention an optical lens group as well as an optical image acquisition device are to be provided with at least one such hybrid lens.

This invention thus starts from an optical hybrid lens, which consists of at least two different materials, in particular with different refractive indices and different dispersions. One of the materials forms a substrate having a predetermined shape, which approximately determines the geometry of the hybrid lens to be produced.

According to the invention, the substrate consists of an optoceramic or optical ceramic, which is sufficiently transparent or transmitting in the spectral range of the light to be imaged and has an acceptably low scattering behavior. According to the invention, the other material covers the surface of the substrate at least in certain sections in order to form a lens surface of the hybrid lens. In this connection, the substrate can have different geometries. The geometry shape can be, for example, planar, spherical or aspherical or can be designed as a surface which is not rotationally symmetric, i.e. as a so-called free-form surface.

Conventional glass ceramics are inorganic materials that are the result of a specific, controlled, thermal post-treatment (also called glazing). For this purpose, a glass is melted from, for example, a powder mixture. In this process crystalline powder is converted into a melt at temperatures above the liquidus. When the melt cools, the latter solidifies amorphously. In this process, this first step corresponds to the normal mass production of glass. After the glass is cooled, the latter is selectively crystallized by applying temperatures below the liquidus, i.e., the glass is partially crystallized. In this process, depending on the chemism, viscosity at the prevailing temperature, the T/t speed, and crystals of specific composition and consequently with special properties in the glass are produced. The latter can be close to the composition of the glass but generally are quite far away from it. In the case of, for example, LAS glass ceramics, for example those of the Schott Company (Ceran®, Robax®, etc.), these high-quartz mixed crystals are precipitated from an alkali-containing Si—Al glass having several constituents. Therefore, conventional glass ceramics represent at least as two-phase ceramics (i.e., consisting of glass and at least one crystal phase).

In contrast to this, optical ceramics or optoceramics in the meaning of this invention are produced by sintering suitable ceramic crystalline powders, preferably nanoscale ceramic crystalline powders. The sintering temperatures lie below the liquidus, i.e., in such ceramics, no melting phase occurs during the production process. Such optical ceramics are preferably single phase ceramics, i.e., the constituents of the ceramics (grains) have the same composition. Depending on the type and amount of sintered additives, the most insignificant portions of glass can occur at the grain boundaries. The latter are clearly below one volume %, however, such that at the transition between glass and crystal, no scattering effects or undesirable scattering effects, but in any case scattering effects to a negligible extent, result.

Due to the fundamentally different production processes the phase as well as the chemism thoroughly distinguish the properties of conventional glass ceramics and of optoceramics in the meaning of this application.

By using the optoceramics, according to the invention, an additional degree of freedom in the final lens design is available. In particular, a comparatively high refractive index and at the same time a comparatively lower dispersion can be achieved. This makes possible novel hybrid lens pairs, according to the invention, having even better imaging properties, in particular smaller imaging defects or aberrations. In particular, the refractive index differences between the materials of the hybrid lens that are used and that are comparatively high according to the invention can be used such that surfaces of the lens, in particular connecting surfaces or interfaces, along which the two different materials are connected to one another, can also be formed with comparatively lower precision and nevertheless can achieve comparatively good imaging properties. While the surfaces of optoceramics, which are usually distinguished by a high hardness and brittleness, must be finished in a comparatively costly and labor-intensive way according to the prior art, the substrate from the optoceramic can be produced in particular also with comparatively lower surface quality according to the invention, and nevertheless an adequate imaging quality of the hybrid lens can be achieved. In particular, the substrate according to the present invention can be produced by sintering suitable powder mixtures to a mother substance (green body) with a suitable shape. According to a further aspect of this invention, the surface quality of the hybrid lens is thus essentially specified by the surface properties of the other material. As the other material, materials that can be processed or shaped in a comparatively simple and economical way are thus preferably used, in particular materials that can be formed precisely in comparison to the melting temperature of the optical ceramic at low temperatures, such as, for example, polymers, low-Tg glasses or else normal glasses, as described in more detail below.

According to another aspect of this invention, the surface of the rest of the material that faces away from the surface of the substrate is made at least in certain sections preferably altogether as a spherically or aspherically curved surface or as a free-form surface. This surface can completely surround or enclose the substrate in particular essentially in half or fully. Thus, according to the present invention hybrid lenses that are shaped precisely can be designed with any lens profile, depending on the desired optical application.

According to another aspect of this invention, in this case the surface of the substrate is designed at least in certain sections and preferably essentially completely as a spherically curved surface. Substrates that consist of an optoceramic with spherically curved surfaces can be produced comparatively economically, in particular by sintering from a suitable powder mixture. By applying the other material with a suitable surface profile, the hybrid lenses according to the present invention can be produced with a suitable lens profile, matching the respective optical application. Since the surface quality of the hybrid lens essentially is specified only by the surface quality of the other material, but not by that of the substrate, according to the present invention economical hybrid lenses with sufficient surface quality and advantageously low imaging defects or aberrations can be produced.

According to another embodiment of this invention, especially if the other material essentially completely surrounds the substrate, the other material has a higher coefficient of thermal expansion than the substrate. When cooling after the application of the other material, the surrounding material that consists of the other material comes under stress, since the substrate prevents the other material from shrinking, which counteracts the development of surface ripples. During cooling, the two different materials thus are pressed advantageously to one another to form a stable material composite.

According to another aspect of this invention, the optical ceramic of the substrate has a higher, preferably essentially higher phononic heat conductivity than the rest of the material. During the production process, in which a form, for example an injection mold or a compression mold, that consists of a material with comparatively higher heat conductivity is used to apply the other material, both the inner and the outer portion of the other material, for example low-Tg glass or polymer, of materials with comparatively higher heat conductivity are thus encompassed, namely inside the ceramic and outside of the form, which consists of, for example, metal or ceramic. The thus achievable comparatively intensive dissipation of heat can be used for a still more precise shaping of the surrounding material or at least the other material that covers in certain sections.

According to another aspect of the present invention, the other material, which covers the substrate at least in certain sections and preferably essentially completely surrounds or encloses the latter, is a glass. It is advantageous that the other material thus can be attached with comparatively higher precision, in particular higher surface quality. For this purpose, a host of suitable process techniques are available, such as, for example, precision blank pressing or casting. The surface quality of the glass that is directly specified by the production process in this case can be basically sufficient so that an expensive surface finishing may be omitted. According to another aspect of the present invention, the surface of the glass, however, also can be still further finished, in particular ground, polished, and/or lapped. The surface of the covering or enveloping glass in this case can assume the shape of a sphere, an aspherical shape or a free-form surface or else can be planar.

In this case, glasses with a comparatively low glass transformation temperature are preferred, such that hybrid lenses with high surface quality can be pressed directly without an expensive surface finishing being necessary.

According to another preferred aspect of this invention, the glass is in particular a low-Tg glass, i.e., a glass with a low glass transformation temperature of, for example, less than about 750° Celsius, preferably less than about 650° Celsius, still more preferably less than about 550° Celsius, and most preferably less than about 450° Celsius, which corresponds to pressing temperatures of less than about 750° Celsius, more preferably less than about 650° Celsius, still more preferably less than about 550° Celsius, and most preferably less than about 450° Celsius. This results in particular in comparatively low stresses in the substrate, which helps to improve the imaging properties. The differences in the coefficients of thermal expansion of the two materials should be less than about 10 ppm/K, preferably less than about 5 ppm/K, still more preferably less than about 1 ppm/K, and most preferably less than about 0.5 ppm/K. In a special embodiment, owing to a selected specific different thermal expansion of the inner ceramic and the outer glass, the glass surface is put under compressive stress to increase the strength of the composite. In this connection, the thermal expansion of the ceramic ideally is more than 0.1 ppm/k, more preferably more than about 1 ppm/K, still more preferably more than 5 ppm/K, and most preferably more than about 10 ppm/K greater than the thermal expansion of the glass.

Thus, a substrate from an optoceramic can be sealed in a glass or melted. As another connecting technique, in particular bonding is suitable, in which, for example, an inorganic aqueous solution, in particular phosphates, is applied as "adhesive" to the surfaces of the materials that are to be connected to one another, i.e., ceramic substrate and glass substrate, and the connection is then carried out at a bonding temperature of less than about 300° Celsius, preferably in the range of between about 100 to 150° Celsius.

According to another aspect of this invention, the glasses, ceramics or composites that are used can also be sufficiently transparent in the IR spectral range or the UV spectral range in order to be suitable for applications in the above-mentioned spectral ranges. For this purpose, for example, chalcogenide glasses or germanium-containing oxidic glasses or UV-transmittive phosphate glasses can be used. Also, a combination with crystals, such as, for example, CaF, ZnS, ZnSe or Si, is possible.

According to another aspect of this invention, the other material is a polymer. Of course, polymer elements can be produced with simple and economical processing techniques, such as, for example, injection molding, casting and curing (hardening) or pressing, as well as by subsequent shaping techniques, such as, for example, heat deformation, hot pressing or hot embossing at a temperature above a softening temperature of the respective polymer, with higher surface quality.

In this case, the polymer can be a thermoplastic resin, which is molded, for example, under the action of heat, by injection molding or embossing, in particular hot embossing, or the polymer can be a thermosetting plastic, which is formed by, for example, a casting process and subsequent curing (hardening), in particular by UV curing.

For adjusting the refractive index and reconciling the optical dispersion, inorganic nanoparticles can be admixed into the polymer, as is described in, for example, US 2003/0231403, the whole content of which shall expressly be included in this application for disclosure purposes by way of reference. While fine particles that are admixed into a polymer material usually increase the light scattering and considerably impair the transmission, the scattering behavior and the transmission are impaired to a negligible extent if the size of the admixed particles is essentially smaller than the wavelength of the light that is to be imaged. Thus, according to the present invention nanoparticles with a maximum length of, for example, less than about 20 nm are admixed into the polymer. In this way, in particular the temperature dependency of the refractive index of the polymer can be essentially compensated. While the refractive index of a polymer decreases with increasing temperature, the refractive index of the admixed inorganic nanoparticles is increased if the temperature increases. Thus, the two temperature dependencies can be essentially compensated, which results in a stable refractive index. As an example of such nanoparticles, in particular $Nb_2O_5$ particles can be mentioned, which are admixed into an acrylic resin.

Of course, this invention is not limited to the use of only two different materials. According to further related aspects of this invention, three or more different materials can be suitably combined to form lens triplets, lens quadruplets or the like. The latter can be produced from a substrate that consists of an optoceramic and by suitable application, as described above, of additional suitable materials. In a special embodiment, the material combinations are selected such that the partial dispersions of the individual materials are matched so that the chromatic aberrations are kept as low as possible. In this connection, in particular ceramics with anormal partial dispersions are suitable.

In this case, in addition, diffractive optical structures can be formed in or on the lens surface, for example in the type of Fresnel zone plates, diffraction grating or the like, for example by hot embossing of the lens surface. According to another aspect, the diffractive structures can also be formed by light exposure of the other material or of the second material, which contains a photosensitive material.

Of course, this invention is not limited to the formation of transmissive optical hybrid lenses. Rather, the lens surface can also have an at least partially reflective effect, for example in the type of a concave mirror provided with a reflective coating. In such an embodiment, the substrate and the material or the materials can also be opaque in sections.

Additional related aspects of the present invention relate to an optical lens group comprising at least one hybrid lens, as described above, as well as an optical image acquisition device having at least one such hybrid lens.

The applications of such hybrid lenses are in the fields of consumer optics and industrial optics. Among these, in particular the applications below can be defined: camera phones, digital cameras, digital projection, binoculars, microscopy, endoscopy, measuring optics, sensor optics, process monitoring, special cameras, night-vision devices, theodolites, and projection systems.

BRIEF DESCRIPTION OF THE DRAWINGS

Below, the invention is to be described in an exemplary manner and with reference to the attached drawings, from which additional features, advantages and objects to be achieved may be derived, wherein.

In the figures, identical reference numbers refer to elements or element groups that are identical or essentially equivalent.

DETAILED DESCRIPTION OF PREFERRED EXEMPLARY EMBODIMENTS

Figure 1A:
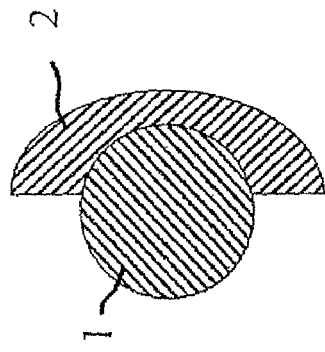
FIGS. 1a and 1b diagrammatically show a process for the production of a hybrid lens according to a first embodiment of the present invention.

FIG. 1a shows a substrate that is used for the production of a hybrid lens according to the present invention as a starting element. According to the present invention, the substrate 1 is formed from an optoceramic (also called optical ceramic), which adequately transmits in the wavelength of the light to be imaged, suitably in the visible spectral range. In this case, the substrate is suitably formed by sintering a suitable powder mixture to a mother substance or green body with a suitable shape. As examples of an optoceramic that should not delimit the scope of the present invention, the following can be cited: YAG, $Y_2O_3$, $ZrO_2$, $Al_2O_3$, $GdAl_2O_3$, ScO2, LuO2 as well as perovskite in different compositions. In addition, mixing and doping of the ceramic phases are also possible. Cubic structures are preferably used based on the optically isotropic properties. These materials can be used as polycrystalline materials or else as monocrystalline materials in the form that is described herein. The substrate can be formed as a flat or planar substrate or as a substrate with one or two spherically curved surfaces. Such substrates can also be produced without expensive surface finishing, in particular by sintering, as described above.

Figure 1B:
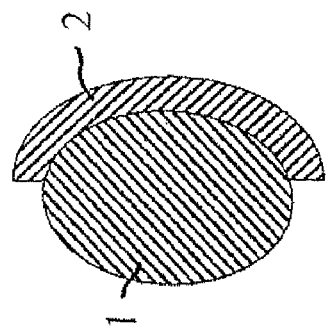

As shown in FIG. 1b, the other material is applied on the substrate according to FIG. 1a to form a hybrid lens according to the present invention, such that the surface of the substrate is covered at least in certain sections in order to form a lens surface. According to FIG. 1b, the substrate 1 is surrounded on half a side by the other material 2 and the lens surface is formed by a surface of the other material. According to FIG. 1b, the surface of the other material is curved aspherically, such that as a whole, a hybrid-lens doublet that consists of a spherical lens 1 and a convex-concave lens is formed from another material.

The other material can be a glass, for example a low-Tg glass or a normal-Tg glass. As examples of low-Tg glasses that shall not be deemed to delimit the present invention, there are cited below: N-PK53 (Schott), N-SK57 (Schott), N-SF66 (Schott) N-PK52A (Schott), N-SF57 (Schott), N-LASF47 (Schott), N-FK15A (Schott), N-FK5 (Schott), and KVC89 Sumita. As examples of normal-Tg glasses that shall not delimit the present invention in no way whatsoever, the following can be cited: LASF35, N-PSK52, N-LF1, SF59, SF66, SF57, LAK33, BK7, N-Lasf31, N-Lasf42, N-SF59, and N-SF57.

Examples of low-Tg glasses are: P-SK57, P-LaSF47, P-PK53, N-FK5, N-FK51A, N-PK52A, N-PK51 of Schott Glas, K-CaFK95, K-PFK80, K-PG325, K-PG375, K-PG395, K-VC78, K-VC78, K-VC79, K-VC80, K-VC81, K-VC89, and K-PSFn2 of Sumita.

The glass can be pressed on by a simple precision blank pressing process or formed by a casting process. The thus achievable surface quality of the glass can be basically adequate for the applications of the hybrid lens, such that no further expensive surface finishing is necessary. In principle, such a surface finishing can be provided, however, for example a grinding, polishing or lapping. In this case, the glass surface can be formed as a spherically or aspherically curved surface, as a free-form surface, or in any other way in matching the respective application.

The other material can also be a polymer according to a further embodiment. When using thermoplastic resins, the other material can be applied to the substrate 1 in particular by injection molding. When using a suitable injection mold, the surface of the other material 2 can already be formed in a suitable way, for example as a spherically or aspherically curved surface, as a free-form surface, or the like. Of course, the thermoplastic resin can further be molded into a lens surface by subsequent heat treatment and hot deformation and/or hot embossing. The polymer can be a thermosetting plastic that is applied in a suitable shape, for example by a casting process and subsequent curing (hardening), in particular thermal curing or UV curing.

As examples of polymers that shall not delimit the invention in no way whatsoever, the following can be cited: PMMA, SAN, PC (polycarbonate), PS (polystyrene), COC (zeonex, topas), fluoropolymers, epoxides or epoxide resins, and polyurethane.

Nanoparticles for adjusting the refractive index can be admixed into the polymer. As examples of such polymers that shall not be deemed to delimit this invention, the following can be cited: fluoropolymers, into which suitable oxides or fluorides are admixed, for example $TiO_2$, $ZrO_2$, $SnO_2$, ZnO, $Y_2O_3$, ITO, CaF, and BaF.

Figure 2:
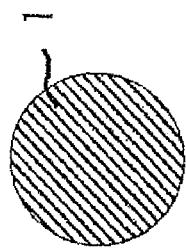
FIG. 2, in a diagrammatic sectional view, shows a hybrid lens according to another related embodiment of the present invention.

According to the present invention, more than two different materials, as cited above, can also be added together to a hybrid lens. This is shown by way of example in FIG. 2. According to FIG. 2, the hybrid lens comprises a spherical lens element 1 that consists of an optoceramic on which a first material 2 that consists of another material is applied. On the surface of the first material 2, another material 3 is applied that namely consists of a different material than the first material.

Figure 3:
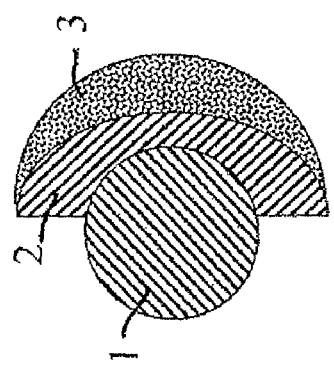
FIG. 3, in a diagrammatic sectional view, shows a hybrid lens according to another related embodiment of the present invention.

FIG. 3 shows another embodiment according to the present invention in which the substrate has an elliptical or aspherical profile.

Figure 4:
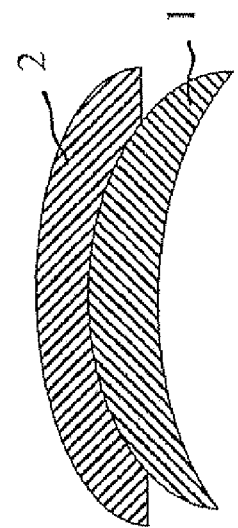
FIG. 4, in a diagrammatic sectional view, shows a hybrid lens according to another related embodiment of the present invention.

FIG. 4 shows another embodiment according to the present invention in which the substrate 1 is completely surrounded by the other material 2. In this case, material combinations are preferred, in which the coefficient of thermal expansion of the surrounding material, for example glass or polymer, is greater than that of the ceramic material. When the hybrid lens is cooled, the surrounding material thus comes under tensile stress, which counteracts the development of surface ripples. During cooling, the two materials are also strongly pressed to one another.

The coefficients of thermal expansion of the different materials are then preferably similar to one another to the extent that if they are bonded in a thermal process at higher temperatures, no excessive stresses on the interfaces can develop that can lead to mechanical or optical deficiencies of the hybrid lens system.

Ideally, material combinations are selected that are suitable in terms of achromatic objectives and apochromatic objectives.

In such an embodiment, it can also be suitable if an optoceramic having a higher phononic heat conductivity than the heat conductivity of the surrounding material is selected. Thus, during cooling, heat from the surrounding material is drawn off both inward, i.e., into the substrate 1, and outward into a surrounding form, for example an injection mold or a compression mold. This facilitates a precise forming process.

Figure 5A:
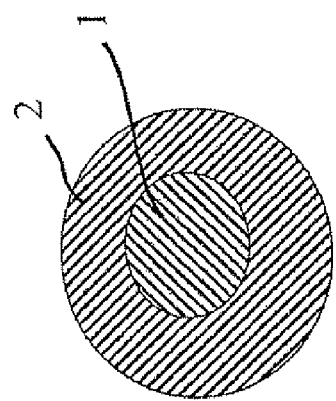
FIGS. 5a and 5b diagrammatically show a process for the production of a hybrid lens according to another related embodiment of the present invention.
Figure 5B:
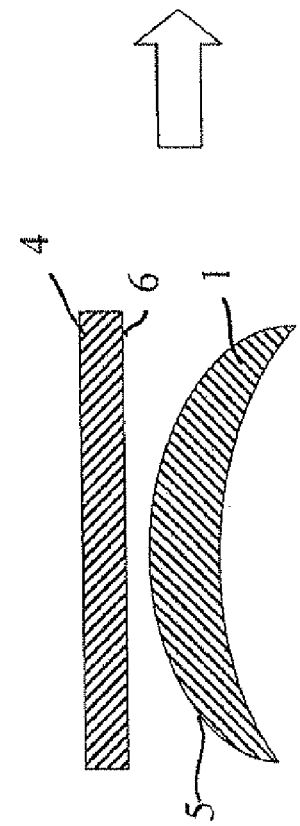

FIGS. 5a and 5b show a production process according to another embodiment of the present invention. According to FIG. 5a, the substrate 1 is provided with curved surfaces. In this case, the surface 5 is convexly curved outward. The substrate 1 is to be connected to a substrate 4 that consists of a different material. To this end, according to a first alternative, the substrate 4 can be molded before the connection in such a way as to form the surface 6 of the substrate 4 that faces the substrate 1 corresponding to the surface 5 of the substrate 1. The connection of the two substrates 1, 4 is carried out by bonding, for which purpose, for example, an inorganic aqueous solution, in particular phosphate, is applied as "adhesive" to the surfaces 5, 6 that face one another, and the connection is carried out at a temperature of below about 300° Celsius, preferably in the temperature range of between about 100 and 150° Celsius. As an alternative, in principle anodic bonding or the use of organic, sufficiently transparent adhesives is also possible.

As an alternative, the deformation of the substrate 4 and bonding can also be carried out simultaneously in a single process step.

Figure 6:
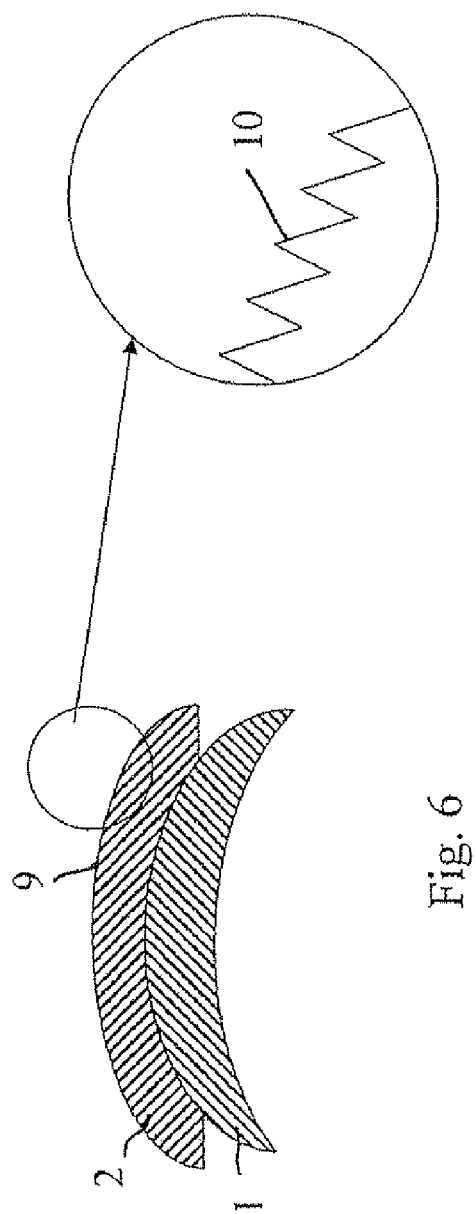
FIG. 6, in a diagrammatic sectional view and in a partial enlargement, shows a hybrid lens according to another related aspect of the present invention.

FIG. 6 shows a hybrid lens according to another embodiment of the present invention. According to FIG. 6, diffractive structures, as indicated by way of example by the sawtooth structure 10, are formed on the surface 9. The diffractive structures can be Fresnel zone plates, diffraction gratings, also blazed diffraction gratings, or the like. Such structures can be formed in particular by hot embossing of the surface 9. As an alternative, such diffractive structures can also be formed by grinding or scribing the surface 9.

Of course, diffractive structures can also be formed in the volume of the rest of the material 2. For this purpose, the other material can contain a photosensitive material, such that the diffractive structures can be written into the volume by light exposure.

As is easily evident to one skilled in the art when studying the description above, hybrid lenses according to the present invention can be used for many applications, for example for optical systems for devices of consumer electronics, pickup systems, for example in the case of optical data storage, for digital cameras, camera phones, video cameras, industrial optical systems, endoscopy optical systems, microscopy optical systems, in particular front lenses of high-aperture objectives, and the like.

Figure 7:
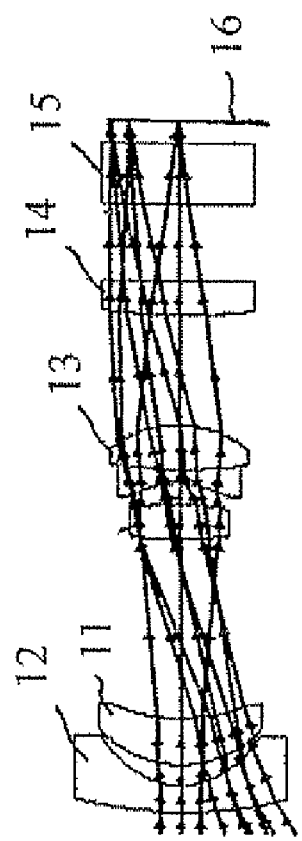
FIG. 7 shows an optical image acquisition device with an optical lens group according to the present invention.
Figure 8:
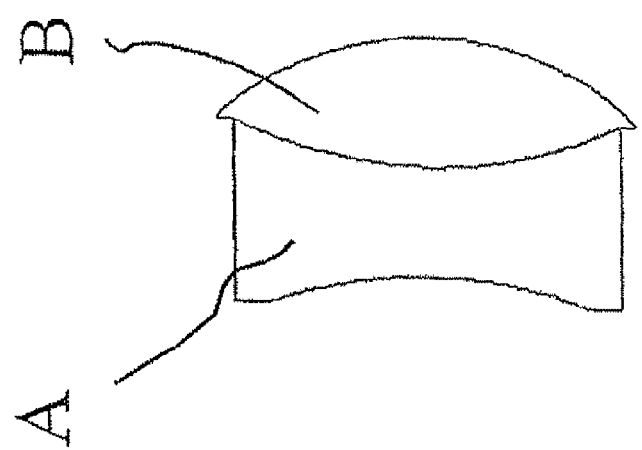
FIG. 8 shows a diagrammatic sectional view of a lens doublet of the lens group according to FIG. 7.

By way of example, FIG. 7 shows an optical image acquisition device according to this invention, with a CCD sensor 16 that acts as an image sensor for image acquisition that is covered by an IR Cut-Filter 15. An individual lens 14, a lens doublet 13, an individual lens and a front lens unit with the lenses 11 and 12 are arranged in front of the IR Cut-Filter 15 opposite the direction of light exposure. According to a first embodiment, the lens doublet was replaced by a hybrid lens according to the invention, which is shown diagrammatically in FIG. 8, and comprises a concave-concave lens A and a convex-convex Lens B, which are connected to one another.

Below, some additional embodiments for the production of hybrid lenses are described by way of example.

Embodiment 1

A ceramic sphere that consists of $Y_2O_3$ is directly connected to a low-TG glass by means of a "precise pressing" process. The glass surface is then aspherical. The selection of the ceramic and the glass is carried out such that, i.a., the partial dispersions are as optimally suitable as possible to avoid chromatic aberrations.

For this purpose, a ceramic sphere that consists of $Y_2O_3$ with a diameter of 3 mm is inserted into a suitable precision blank compression mold. A matching glass element that consists of N-SK57 glass (Schott) is applied, and the press is closed. The compression molds are highly precisely formed. In this case, the glass side of the form has an aspherical configuration. The sandwich is heated to 650° Celsius at a heating rate of 10K/minute, and it is pressed for 15 minutes there at a suitably high pressing pressure. The cooling is carried out at a speed of 30K/minute.

The surface quality of the glass was sufficient so that no further surface finishing was necessary.

Embodiment 2

By precision blank pressing (precise pressing), as described above based on embodiment 1, a hybrid lens that consists of a glass and an optoceramic is formed. Then, a polymer is sprayed on by means of an injection-molding process, which resulted in a hybrid lens comparable to that according to FIG. 2. The surfaces of the hybrid lens did not require any further finishing.

LIST OF REFERENCE NUMBERS

1 Substrate
2 First cover layer
3 Second cover layer
4 Second substrate
5 Surface of the first substrate
6 Surface of the second substrate
9 Surface of the first cover layer
10 Diffractive structures
11 Lens triplet
12 Individual lens
13 Lens doublet
14 Individual lens
15 Cover disk
16 Image sensor/CCD Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 10 2005 045 197.7, filed Sep. 21, 2005, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for manufacturing an optical hybrid lens, comprising the steps of:
   providing a substrate consisting of an optical ceramic, which is polycrystalline and has a predetermined shape; and
   applying a glass material on a surface of the substrate, such that said substrate is covered at least in certain sections in order to form a lens surface; wherein
   a surface of the substrate that faces the glass material is formed in a curved manner;

said optical ceramic has a higher thermal conductivity than said glass;

a mold of a material having a higher thermal conductivity than said glass material is used for applying the glass material; and the glass material is formed or deformed at low temperatures as compared to the melting temperature of the optical ceramic for being applied to said substrate.

2. The process according to claim 1, wherein the mold is a compression mold.

3. The process according to claim 1, wherein a surface of the glass material that faces away from the surface of the substrate is formed at least in certain sections as a spherically or aspherically curved surface or as a free-form surface.

4. The process according to claim 1, wherein the glass material is applied such that the substrate is completely surrounded or enclosed.

5. The process according to claim 4, wherein the glass material has a greater coefficient of thermal expansion than the substrate.

6. The process according to claim 1, wherein the glass material is formed by precision blank pressing or by a casting process.

7. The process according to claim 6, wherein the glass material is a low-Tg glass.

8. The process according to claim 1, wherein the glass material is integrally connected to the substrate.

9. The process according to claim 1, further comprising the step of applying a second material different than the glass material onto a surface of the glass material, such that said surface of the glass material is covered at least in certain sections in order to form a lens surface.

10. The process according to claim 1, wherein diffractive optical structures are additionally formed in or on the lens surface.

11. The process according to claim 10, wherein the diffractive structures are formed by embossing the lens surface.

* * * * *